Nov. 3, 1953
J. MORGENSTERN ET AL
2,658,136
HOLDER FOR AND IN COMBINATION WITH PORTABLE
ELECTRIC SPOTLIGHTS AND CORDS
Filed April 29, 1952
2 Sheets-Sheet 1
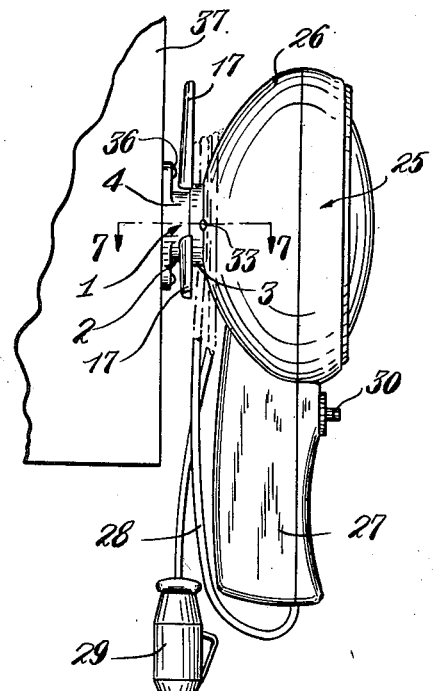
FIG. 1
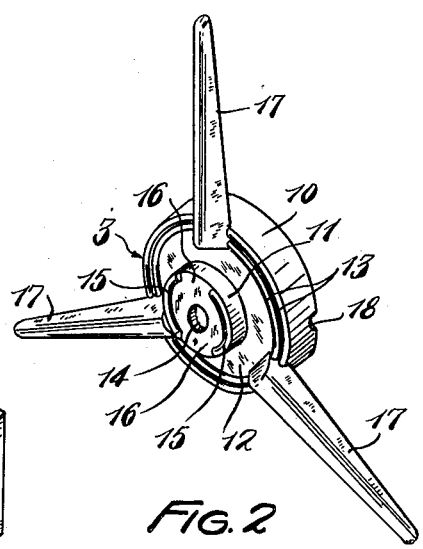
FIG. 2
FIG. 3
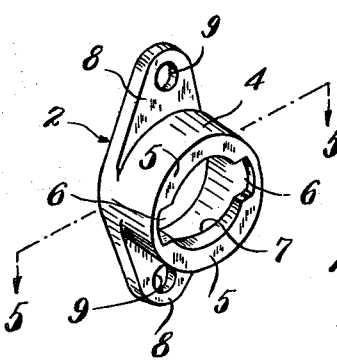
FIG. 4
INVENTORS
JOSEPH MORGENSTERN
BY ELLIOTT MORGENSTERN
West & Oldham
ATTORNEYS Nov. 3, 1953
J. MORGENSTERN ET AL
2,658,136
HOLDER FOR AND IN COMBINATION WITH PORTABLE
ELECTRIC SPOTLIGHTS AND CORDS
Filed April 29, 1952
2 Sheets-Sheet 2
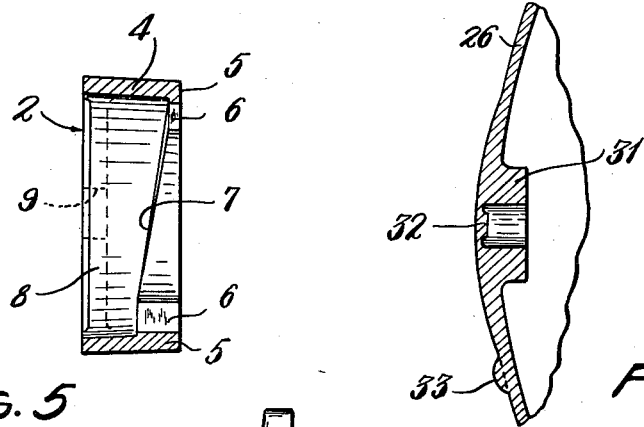
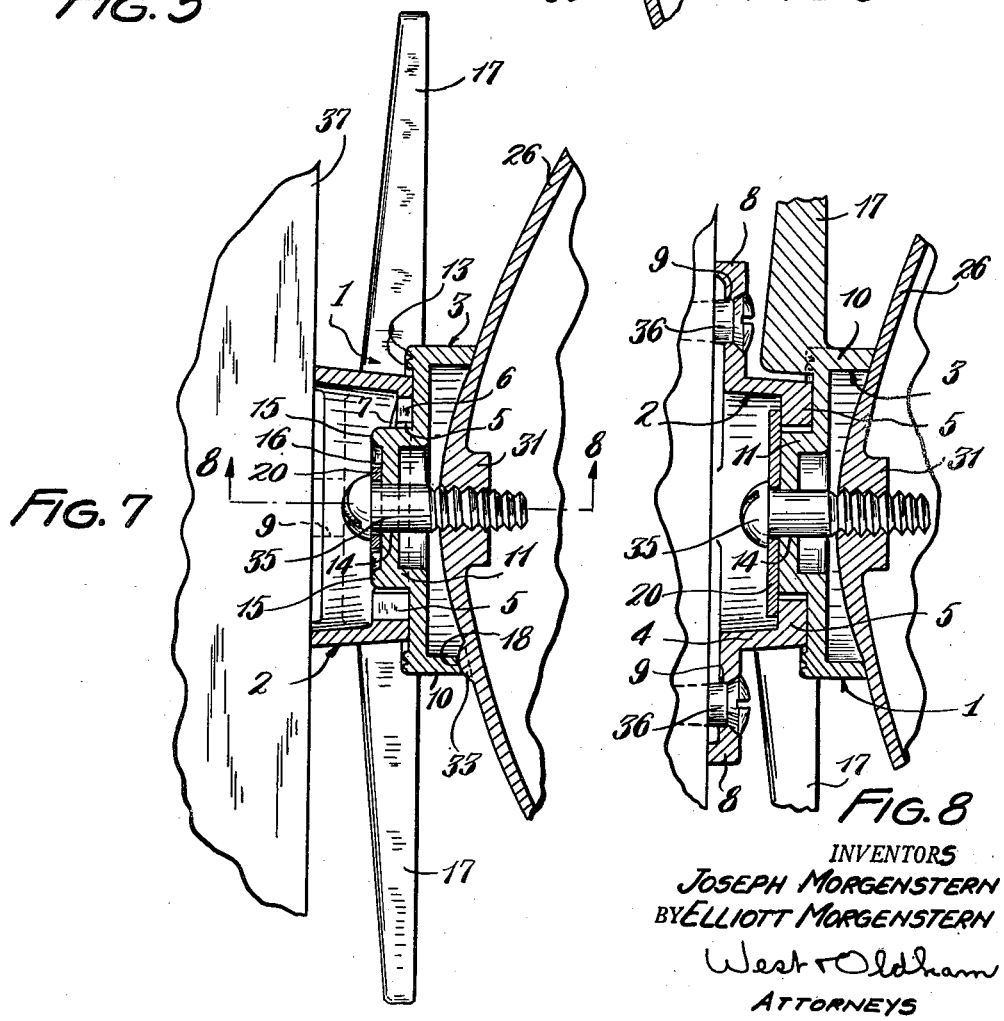
INVENTORS
JOSEPH MORGENSTERN
BY ELLIOTT MORGENSTERN
West Oldham
ATTORNEYS Patented Nov. 3, 1953

2,658,136

UNITED STATES PATENT OFFICE 2,658,136

HOLDER FOR AND IN COMBINATION WITH PORTABLE ELECTRIC SPOTLIGHTS AND CORDS

Joseph Morgenstern, University Heights, and Elliott Morgenstern, Cleveland, Ohio, assignors to Electroline Manufacturing Company, Cleveland, Ohio, a corporation of Ohio Application April 29, 1952, Serial No. 285,034

4 Claims. (Cl. 240—8.18)

This invention is a device for installation on automotive vehicles for supporting portable or so-called "hand" spotlights when not in use.

A spotlight of the type wherewith the herein disclosed embodiment of the invention is intended for use, comprises a substantially semi-spherical casing enclosing an electric light bulb of the kind known as a sealed beam lamp, and including a pistol grip handle. A relatively long electric cord is connected to the spotlight and is equipped at its end remote therefrom with a plug designed for insertion in the socket of a removable cigarette lighter now common on automotive vehicles.

One object of our invention is to provide a relatively simple supporting device or holder for portable spotlights comprising a mounting member and a spotlight attachment member. The former member is adapted to be secured to a suitable support, as a part or wall of a vehicle in convenient reach of the driver or other person who will handle the light, and the other member is designed for incorporation in or attachment to a spotlight casing. The respective members incorporate holding parts that are shaped for interengagement. These parts constitute a separable joint, desirably of the bayonet-joint type, by which the members may be readily connected together when it is desired to hang up the spotlight, and as readily disconnected when it is desired to use the spotlight. These operations are accomplished while grasping the spotlight by the handle.

Another object of the invention is to provide a support or holder of the aforesaid character involving a separable joint wherein certain of the interengaging parts are resilient or yielding so that the joint will hold under tension and better withstand vibration without becoming loose. This quality also insures ease of operation, and compensates for any slight irregularities in the interengaging and contacting parts of the members.

A further object of the invention is to provide a holder for portable electric spotlights including means for sustaining the electric cord in compact condition when the spotlight is not in use.

The device is applicable to prevailing spotlights of the general character of the one above described, although the invention, in a more limited aspect, has the further object of providing a portable spotlight including a shell having a readily removable part commonly known as a "knock-out," which enables an aperture to be easily and quickly made by removing the knock-out plug in the customary manner—that is, by giving it a sharp rap with a suitable implement—the aperture being adapted to receive a self-tapping screw of a given size by means of which the attachment member may be secured to the casing or shell of the spotlight. Such a spotlight may be sold and used independently of the holder, or a holder may be readily combined with such a spotlight at the time of manufacture or sale, or at any time thereafter.

An embodiment of the invention wherein the foregoing objects are attained, with other objects hereinafter appearing, is illustrated in the accompanying drawings that form a part hereof and wherein like reference characters designate like parts throughout the several views.

In the drawings,

Fig. 1 shows, in side elevation, a portable electric spotlight supported as from a part of an automotive vehicle by means of our invention;

Fig. 2 is a perspective view of the attachment member with the resilient holding part or element removed therefrom;

Fig. 3 is a perspective view of the resilient holding part or element;

Fig. 4 is a similar view of the mounting member;

Fig. 5 is a horizontal central section through the mounting member, the plane of section being indicated by the line 5—5 of Fig. 4, the present and following views being drawn to a scale considerably larger than actual size;

Fig. 6 represents a fragmentary horizontal section through the shell of a spotlight casing especially designed and constructed for use with the holder of our invention;

Fig. 7 is a central horizontal section through the holder and adjacent portion of the casing shell, on the line 7—7 of Fig. 1, and Fig. 8 is a vertical section on the line 8—8 of Fig. 7.

The holder, designated generally by the reference numeral 1, comprises a mounting member 2 and a spotlight attachment member 3. The mounting member includes a hollow, substantially cylindrical body portion 4, provided, at its outer end, with segmental flanges 5, that are separated at their ends by notches 6. The outer surfaces of the flanges 5 are in a common plane normal to the axis of the member, while the inner surface of each is tapered to provide cam faces 7, such face of each flange being reversed with respect to that of the other. Ears 8 are shown as extending in opposite directions from the rear end of the body 4, each having an aperture 9 for fastening means by which the mounting member may be secured to a suitable support, as a wall or other part of a vehicle.

The attachment member 4 has a substantially cylindrical body portion 10 from the outer end of which extends, in substantially concentric relation to said body portion, a smaller but similarly shaped boss 11. Surrounding said boss and connecting it to the peripheral wall of the body portion 10 is an annular wall shoulder 12. This latter wall is shown as surrounded by double beads 13. The outer end of the boss 11 is closed by a circular wall having a central aperture 14, and provided with segmental ribs 15 that follow the peripheral wall of the boss. The ends of the opposed ribs 15 are spaced apart and thus provide diametrically opposed spaces 16.

Radiating from the body portion 10 of the attachment member 3 are a plurality of fingers 17, the same being located adjacent the outer end of said body portion. The fingers are desirably tapered and their larger ends overhang the wall 12. Both members 2 and 3 desirably consist of die castings of sufficient wall thickness to insure adequate strength and minimum weight. The peripheral wall of the body portion 10 of the member 3 has a notch 18 at its inner edge for a purpose presently to appear, and the inner face of said edge has a contour complementary to that of the portion of a spotlight casing wherewith it is designed for engagement.

20 denotes a holding part or element, shown in perspective in Fig. 3, that consists of a strip of relatively stiff, resilient metal of a width slightly less than that of the notches 6 of the mounting member 2. Said part or element has a central aperture 21, and is of a length slightly less than the distance between the arcuate walls of the opposed notches 6.

As we have previously pointed out, the holder is adapted for use with prevailing portable spotlights of the general type described. However, our invention comprehends the production of a spotlight casing that is especially designed for use with the holder. A portable spotlight, designated generally by the reference numeral 25, is shown in Fig. 1. The casing of the spotlight includes a substantially semispherical shell 26, and a so-called pistol grip handle 27. The spotlight is equipped with an electric cord 28, shown as extended outwardly through the lower end of the handle, and to the end of the cord remote from the spotlight is attached a plug 29 of a character suitable for use in the socket of a cigarette lighter of an automotive vehicle. An electric switch 30 is incorporated in the spotlight.

When constructed especially for use with the holder, the central region of the shell 26, a fragment of which is shown in Figs. 6, 7 and 8, is somewhat thickened throughout its central region and, substantially coincident with the axis of the semispherical portion of the casing, the rear wall is provided with an inwardly extending hollow boss 31 the bore of which is initially closed at its outer end by a knock-out plug 32. The shell 26 is provided on its outer side with a locating lug 33, spaced from the axis of the shell a distance approximately equal to the radius of the body portion 10 of the member 3.

Preparatory to securing the attachment member 3 to the spotlight casing, the knock-out plug 32 is removed, as by striking it a quick blow with a suitable implement. Thus an aperture is provided for the reception of a fastening device, preferably a self-tapping metal screw designated 35 in Figs. 7 and 8. The holding part or element 20 is placed against the outer end of the boss 11 with its end portions extending through the spaces 16 and its aperture 21 registering with the aperture 14 of said boss, the extremities of said part or element extending beyond the peripheral wall of the boss. The screw 35 is now projected through the aforesaid apertures and into the aperture provided by the removal of the knock-out plug 32 and is turned to cut threads in the surrounding portion of the shell 26. As the screw is tightened it draws the inner end of the body portion 10 firmly against the shell, it being assumed that the notch 18 of the body portion 10 is in a position to receive the locating lug 33 on the shell.

When the attachment member 3 is thus secured to the spotlight casing, a space is provided between the shell 26 and the fingers 17 within which the cord 28 may be wound about the body portion 10, as indicated in dotted lines in Fig. 1.

The mounting member 2 is secured by fastening means or screws 36 to a suitable support 37, such as a wall or other part of an automotive vehicle. The member may, for example, be attached to the side wall of a vehicle body beneath the cowl, or to a part of the cowl on the underneath side thereof, or to the instrument panel. With the mounting member secured to a support, and with the cord 28 wound about the body portion 10 as indicated, the spotlight 25 may be grasped by the handle 27 and presented to the mounting member with the holding part or element 20 aligned with the notches 6. Now, by projecting the boss 11 through the space between the flanges 5 of the mounting member into the recess enclosed by said member, until the annular wall 12 of the attachment member engages the outer faces of said flanges, and turning the spotlight about the axis of the boss 11, the ends of the holding part or element 20 may be caused to override the inner cam faces of the flanges 5 thereby to hold the members firmly together, desirably with the part or element 20 under tension. By reverse operation, the spotlight may be disengaged from the mounting member.

While we have herein disclosed the presently preferred form of our invention, it is to be understood that we do not limit ourselves to the illustrated construction, further than required by the claims hereto annexed, as interpreted in the light of the prior art.

Having thus described our invention, what we claim is:

1. A holder for portable electric spotlights of the kind equipped with an electric cord and including a substantially rigid casing shell, the shell having an aperture, an attachment member adapted to be engaged with the shell about said aperture and provided with a rearwardly extending boss, said boss having an aperture for alignment with that of the shell, a resilient holding element engaged with the rear end of the boss and extending transversely thereof and projecting at its ends beyond the boss, said element having an aperture aligned with that of the boss, a fastening member provided with an abutment for engagement with said element and projecting through the apertures of said element, the boss and said shell, for binding the parts together, a mounting member adapted to be secured to a support, said member enclosing a recess that opens through the front of the mounting member and is adapted to receive the boss of the attachment member, opposed segmental flanges extending toward each other from the front end of the mounting member in spaced relation to each other and having rear cam faces, the boss being adapted to be projected into the recess between said flanges and rotated about its axis thereby to engage the ends of said holding elements with the cam faces of the flanges, and retaining means for the electric cord, said means being carried by and extending radially from the attachment member in rearwardly spaced relation to the casing shell and having a somewhat lesser radius than said shell.

2. In combination, a portable spotlight characterized by a casing shell having a convex rear surface, the shell being provided with an aperture that opens through said surface, and with a locating lug in radially spaced relation to said aperture, and a holder for the spotlight comprising an attachment member including a body portion shaped at its forward end to fit said surface about said aperture and having a notch for the reception of said locating lug, said body portion having a substantially cylindrical peripheral surface and an annular rear wall, a substantially cylindrical boss projecting rearwardly from said wall in substantially concentric relation to the peripheral surface of the body portion, a holding element consisting of a resilient metal plate of a length greater than the diameter of said boss and of a width less than said diameter engaged with the rear end of said boss, said element and the boss having apertures adapted to be aligned with the aperture of the shell, a headed screw for projection through the apertures of said element and the boss and for threaded engagement within the aperture of the shell thereby to bind said element, member and shell together, the boss including retaining parts that engage the sides of the element for holding it against turning with respect to the boss, and a mounting member adapted to be secured to a support and enclosing a recess that opens through the front of the mounting member and is adapted to receive the boss of the attachment member, opposed segmental flanges projecting toward each other adjacent the front of said recess and being spaced apart at their ends to permit passage of the ends of the holding element when the boss is extended into the recess, said flanges having rear cam faces wherewith the ends of said element are engaged when the boss is projected into the recess and rotated about its axis.

3. The combination of a portable spotlight and a holder therefor, as defined by claim 2, wherein said spotlight is electrical and is equipped with an electric cord, and said attachment member incorporates fingers that radiate from its body portion in substantially the plane of said anular rear wall thereby to provide a space between said fingers and the casing shell wherein said cord may be wound about the body portion of the attachment member.

4. The combination and arrangement of parts defined by claim 2, wherein said casing shell is provided with a knock-out plug removable to produce the aperture that opens through the convex rear surface of the casing shell.

JOSEPH MORGENSTERN.
ELLIOTT MORGENSTERN.

References Cited in the file of this patent

UNITED STATES PATENTS

| Number | Name | Date |
|---|---|---|
| 1,259,823 | Archer | Mar. 19, 1918 |
| 1,714,518 | Owen | May 28, 1929 |
| 1,727,149 | White | Sept. 3, 1929 |
| 2,076,020 | Fraser | Apr. 6, 1937 |
| 2,265,446 | Poglein | Dec. 9, 1941 |
| 2,334,900 | Bosten | Nov. 23, 1943 |